(12) United States Patent
Tursunovna et al.

(10) Patent No.: US 12,484,586 B1
(45) Date of Patent: Dec. 2, 2025

(54) BIOPREPARATION AGAINST ECTOPARASITES OF CATTLE AND METHOD OF APPLICATION THEREOF

(71) Applicant: S. Seifullin Kazakh Agrotechnical Research University, Astana (KZ)

(72) Inventors: Gulzhan Yeszhanova Tursunovna, Astana (KZ); Lyudmila Lider Aleksandrovna, Astana (KZ); Rashit Uskenov Bakhitzhanovich, Astana (KZ); Saule Bostanova Kuanyshpekovna, Astana (KZ); Alibek Mutushev Zhumabekovich, Almaty (KZ); Aigul Yernazarova Karievna, Almaty (KZ); Gulnur Mamytbekova Kurbanalievna, Astana (KZ)

(73) Assignee: S. Seifullin Kazakh Agrotechnical Research University, Astana (KZ)

( * ) Notice: Subject to any disclaimer, the term of this patent is extended or adjusted under 35 U.S.C. 154(b) by 0 days.

(21) Appl. No.: 19/217,261

(22) Filed: May 23, 2025

(51) Int. Cl.
| | | |
|---|---|---|
| *A01N 65/22* | (2009.01) | |
| *A01N 31/08* | (2006.01) | |
| *A01N 61/00* | (2006.01) | |
| *A01P 7/02* | (2006.01) | |
| *A01P 7/04* | (2006.01) | |
| *A01P 17/00* | (2006.01) | |

(52) U.S. Cl.
CPC ............ *A01N 65/22* (2013.01); *A01N 31/08* (2013.01); *A01P 7/02* (2021.08); *A01P 7/04* (2021.08); *A01P 17/00* (2021.08)

(58) Field of Classification Search
CPC combination set(s) only.
See application file for complete search history.

(56) References Cited

U.S. PATENT DOCUMENTS

| | | | |
|---|---|---|---|
| 9,873,639 B1 * | 1/2018 | Doccola | C05G 3/60 |
| 2017/0181435 A1 * | 6/2017 | Nave | A01N 57/28 |
| 2017/0210677 A1 * | 7/2017 | Bontchev | C09K 17/04 |

FOREIGN PATENT DOCUMENTS

| | | |
|---|---|---|
| RU | 2228029 C2 | 5/2004 |
| RU | 2342835 C1 | 1/2009 |
| RU | 2426534 C1 | 8/2011 |
| RU | 2689700 C1 | 5/2019 |
| RU | 2708083 C1 | 12/2019 |

OTHER PUBLICATIONS

Kang, Y.G. et al., "Effect of pyrolysis conditions on chemical properties of carbonized rice husks for efficient $NH_4^+$ adsorption," Applied Biological Chemistry, vol. 66, article No. 45, pp. 1-10 (2023).*
Ebe, S. et al., "Rice husk biochar with beneficial microbes: a promising agricultural inoculant and soil ameliorant," Research Outreach, Apr. 2, 2020, retrieved from the Internet: <https://researchoutreach.org/articles/rice-husk-biochar-agricultural-inoculant-soil-ameliorant/ >.*
Hidayat, A. R. et al., "Analysis of rice husk biochar characteristics under different pyrolysis temperature," IOP Conference Series: Earth and Environmental Science, 1201, 012095, pp. 1-9 (2023).*
Buss, W. et al., "Inherent organic compounds in biochar—their content, composition and potential toxic effects," Journal of Environmental Management, vol. 156, pp. 150-157 (2015).*
Zhu, J.J. et al., "Comparisons of antifeedancy and spatial repellency of three natural product repellents against horn flies, Haematobia irritans (Dipter: Muscidae)," Pest Management Science, vol. 71(11), pp. 1553-1560 (2015).*
Li, Z. et al., "Review on rice husk biochar as an adsorbent for soil and water remediation," Plants, vol. 12, pp. 1-19 (2023).*

* cited by examiner

*Primary Examiner* — John Pak
(74) *Attorney, Agent, or Firm* — Renner, Otto, Boisselle & Sklar, LLP

(57) ABSTRACT

A biopreparation against ectoparasites of cattle includes pyrolysis products of plant fiber, *Nepeta cataria* essential oil, and water.

2 Claims, 2 Drawing Sheets

BIOPREPARATION AGAINST ECTOPARASITES OF CATTLE AND METHOD OF APPLICATION THEREOF

FIELD OF THE INVENTION

This application relates generally to the fields of parasitology and animal invasion diseases in veterinary medicine and pharmacology, and, more particularly, to biopreparations that are used for the prevention and control of diseases caused in cattle by ectoparasites.

BACKGROUND OF THE INVENTION

Numerous insectoacaricidal preparations exist for combating animal ectoparasites. One such formulation is liquid insecticidal soap derived from rapeseed oil and hydrolysate of *Arternia* sp., composed of 0.15-0.45% insecticidal soap, 0.15-0.45% hydrolysate Artemia sp., and water. Experimental studies have shown a 100% recovery rate, as only dead mites were found in the auricular crusts of treated rabbits 24 hours after application. However, its limitation lies in its clinical testing against only one type of ectoparasite—*P. cuniculi* mites—without data on other species, including agricultural animal ectoparasites.

Another known preparation is a powdered insectoacaricidal agent based on a microstructured amorphous silica carrier, containing synthetic pyrethroids combined with fluralaner and microstructured amorphous silica as a filler. Also, the insectoacaricidal agent "Almet-2" is known for fighting arachnoentomoses in animals. "Almet-2" includes alphamethrin, surfactant, alcohol, and solvent, and additionally contains chloracetophos, glycerin, and dimethyl sulfoxide, with isopropyl alcohol as the alcohol and neonol as the surfactant. Although effective against scabies mites, subcutaneous warble flies, and houseflies, the synthetic pyrethroids used in both preparations are undesirable for environmental, therapeutic, and regulatory reasons. In addition, "Almet-2" contains chlorinated components, which could cause allergic reactions, dermatitis, respiratory diseases, and convulsions in animals.

A related preparation is a coniferous repellent composed of an aqueous emulsion containing oxamate and a coniferous-glycerin bioactive additive. The conifer-glycerin biologically active additive is obtained by extracting biologically active substances from tree greenery with glycerin and isolating the extract. The extraction was performed at 60-120° C. for 2-10 hours, with glycerin acting as the extractant and allowing the extraction of both water-soluble and lipid-soluble substances. Tests of the product's effectiveness in protecting livestock from insects showed that this preparation provides repellent action for 12 hours at a dose of 250 ml of emulsion per animal. A disadvantage of this preparation is the short 12-hour duration of the repellent effect, thereby requiring frequent reapplications throughout the summer season and leading to excessive consumption of the product.

Another preparation is an insectoacaricidal preparation for repelling insects that is applied using a device with the ability to adjust composition emission. The chemical composition of the insect repellent is chosen from essential oils and active ingredients of essential oils. The device containing the active ingredient for regulated emission of an environmentally safe insect repellent composition remains active for the required period, which can be adjusted. A disadvantage is that testing was conducted only with respect to warehouse insects. In addition, the active ingredient used for regulated emission of the preparation involves pyrethroids or other chemical compounds.

It is an aim of the invention to develop an effective and safe biopreparation for preventing ectroparasitoses in cattle. In particular, it is an aim of the invention for such a biopreparation to provide high insectoacaricidal repellent effects while eliminating the use of unsafe synthetic pyrethoids and other chemical agents.

SUMMARY OF THE INVENTION

In accordance with an embodiment of the present invention, there is provided a biopreparation against ectoparasites of cattle. The biopreparation includes pyrolysis products of plant fiber, *Nepeta cataria* essential oil, and water.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF THE INVENTION

Figure 1:
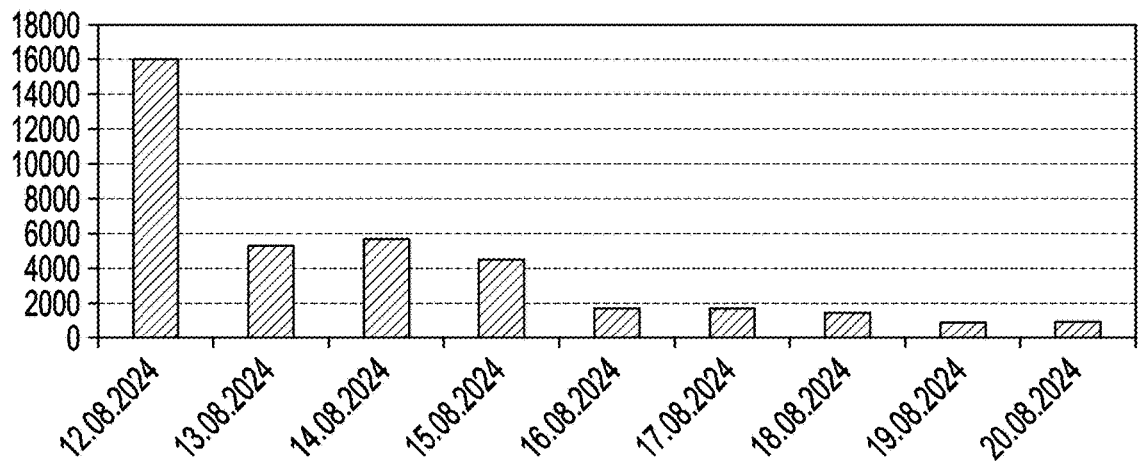
FIG. 1 is a graphical view illustrating an example of a volume of the biopreparation applied by treatment days according to the present invention during a first period.

The following detailed description is provided to assist the reader in gaining a comprehensive understanding of the products and methods described herein. However, various changes, modifications, and equivalents of the products and methods described herein will be apparent to one of ordinary skill in the art. In addition, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The aim of the invention is accomplished through incorporation of pyrolysis products of plant fiber, *Nepeta cataria* essential oil, and water into a biopreparation for application to cattle to control bovine ectoparasites.

The liquid-phase biosubstance, which is the basis of the biopreparation, is obtained by dry distillation (pyrolysis) of rice husks with a high content of resinous substances. According to chemical indicators, the obtained biosubstance from rice husks contains phenol, phenolic acids, and cresol within permissible normative values, which determines its insectoacaricidal properties.

The active component of the plant-based biopreparation is the essential oil from *Nepeta cataria*. The processing of the essential oil raw material is carried out by steam distillation. Distillation with water, or hydrodistillation, is performed using a Clevenger apparatus (GF5.184.082), which consists of a 1000 ml evaporating flask, a sealed, integrated cooling system, and a B-36-50 laboratory funnel according to GOST 25336-82. The water-to-plant material ratio is 1:10. After the distillation of Nepeta cataria plant material with steam, the volume of the obtained essential oil is measured and expressed as a percentage relative to the absolutely dry raw material.

The method of testing and calculations is carried out in accordance with GOST 24027.2-80. After the distillation of Nepeta cataria plant material with steam, the volume of the obtained essential oil was measured, expressed as a percentage of the absolutely dry raw material, after which 0.2% of essential oil was added to 100 ml of liquid phytosubstance. Nepeta cataria L., otherwise known as captnip, contains up to 3% essential oils and also contains nepetalactone, a substance that exhibits repellent activity comparable to the known preparation DEET (diethyltoluamide).

The obtained biopreparation is intended for external use by spraying the skin surface of animals.

Preclinical testing of the systemic action of the proposed biopreparation was conducted on rabbits and white mice. The toxicity of the biopreparation for laboratory animals and its harmlessness to the cattle organism were studied when applied in the recommended regimes, doses, and concentrations according to clinical, hematological, and biochemical parameters.

It was established that the tested concentrations of the biopreparation, 0.01% and 0.02%, exhibited comparatively low toxicity for warm-blooded animals. When instilled into the conjunctival sac of rabbit eyes, the 0.01% concentration caused brief tearing and mild hyperemia of the mucous membranes, which disappeared within 2-3 hours after treatment; at a 0.02% concentration, slight tearing and hyperemia were observed, disappearing within 4-5 hours after installation.

Results of irritation testing of the biopreparation on the skin of rabbits are presented. Before the trials, the temperature, pulse, and respiration of the rabbits (n=5) were measured. After applying the biopreparation at the tested concentrations to the skin, the clinical status and local reactions were observed. The dynamics of changes in temperature, pulse, and respiration, as well as changes in the condition of the skin, were evaluated at 10, 20, 40, 60, 120 minutes, and after 4 hours post-exposure. It was found that the biopreparation at concentrations of 0.5%, 1%, and 2% did not cause local negative changes in the skin or alterations in clinical parameters, with a reaction score of 0.

At a 5% concentration, the biopreparation caused mild erythema and slight swelling of the skin, with a reaction score of 1. A more pronounced reaction was observed at a 10% concentration, with signs of irritation such as itching, moderate hyperemia, and slight tissue swelling. The animals exhibited general agitation. These symptoms gradually disappeared within 1-1.5 hours without medical intervention. The reaction score was 2.

Changes in the dynamic clinical parameters of Chinchilla rabbits exposed to the biopreparation at 5% and 10% concentrations are reflected in Tables 1 and 2.

TABLE 1

Clinical Parameters of Animals (n = 5) Before and After Exposure to the Biopreparation at a 5% Concentration

| Indicators | Temperature (° C.) | Pulse (beats/min) | Respiration Rate (breaths/min) |
| --- | --- | --- | --- |
| Before Exposure | 37.3 ± 0.18 | 155 ± 1.23 | 89 ± 0.72 |
| 10 min post-application | 37.5 ± 0.03 | 158 ± 0.56 | 95 ± 0.61 |
| 20 min | 37.0 ± 0.08 | 156 ± 0.11 | 93 ± 0.45 |
| 40 min | 37.6 ± 0.04 | 154 ± 0.1 | 88 ± 0.1 |
| 1 hour | 37.5 ± 0.04 | 155 ± 0.1 | 90 ± 0.1 |

TABLE 2

Clinical Parameters of Animals (n = 5) Before and After Exposure to the Biopreparation at a 10% Concentration

| Indicators | Temperature (° C.) | Pulse (beats/min) | Respiration Rate (breaths/min) |
| --- | --- | --- | --- |
| Before Exposure | 37.8 ± 0.02 | 152 ± 0.47 | 92 ± 0.61 |
| 10 min post-application | 38.2 ± 0.04 | 162 ± 0.98 | 108 ± 1.6 |
| 20 min | 38.0 ± 0.02 | 162 ± 3.3 | 103 ± 1.12 |
| 40 min | 37.6 ± 0.02 | 154 ± 1.2 | 98 ± 0.6 |
| 1 hour | 36.9 ± 0.01 | 146 ± 0.4 | 94 ± 0.08 |

As seen in Table 1, exposure of rabbit skin to the biopreparation at a 5% concentration did not result in significant changes in clinical parameters over time. Body temperature, pulse rate, and respiratory rate remained within physiological limits throughout the observation period.

When exposed to the biopreparation at a 10% concentration, as is illustrated in Table 2, a slight increase in body temperature of 0.4° C. (P≤0.001) was observed after 10 minutes, but this parameter returned to baseline levels after 40 minutes.

Heart rate increased by 6.2%, while respiratory rate showed an increase of 6.12% to 14.81%. These changes were most pronounced during the first 10 to 40 minutes of exposure. However, after 1 hour, as the skin reaction subsided, both pulse and respiratory rates exhibited a tendency to return to their initial physiological values, as is indicated in Tables 3 and 4 herebelow.

TABLE 3

Clinical Parameters of Rabbits (n = 5) Before and After Inhalation Exposure to the Biopreparation at a concentration of 0.1 mg/m$^3$ in the Atmosphere

| Indicators | Temperature (° C.) | Pulse (beats/min) | Respiration Rate (breaths/min) |
| --- | --- | --- | --- |
| Before Exposure | 37.8 ± 0.06 | 152 ± 0.58 | 92 ± 0.61 |
| 10 min post-inhalation | 38.6 ± 0.08 | 168 ± 1.66 | 118 ± 2.6 |
| 20 min | 38.0 ± 0.02 | 172 ± 2.05 | 113 ± 2.11 |
| 40 min | 37.6 ± 0.02 | 154 ± 0.24 | 98 ± 0.62 |
| 1 hour | 37.5 ± 0.03 | 140 ± 1.28 | 98 ± 0.6 |

TABLE 4

Clinical Parameters of White Mice (n = 5) Before and
After Inhalation Exposure to the Biopreparation
at a concentration of 0.1 mg/m$^3$ in the Atmosphere

| Indicators | Temperature (° C.) | Pulse (beats/min) | Respiration Rate (breaths/min) |
|---|---|---|---|
| Before Exposure | 38.2 ± 0.12 | 324 ± 2.6 | 128 ± 1.29 |
| 10 min post-inhalation | 39.8 ± 0.16 | 448 ± 12.4 | 208 ± 8.6 |
| 20 min | 39.5 ± 0.13 | 356 ± 3.2 | 162 ± 3.4 |
| 40 min | 38.9 ± 0.07 | 329 ± 0.58 | 120 ± 0.81 |
| 1 hour | 38.7 ± 0.05 | 328 ± 0.044 | 122 ± 0.63 |

The results of the inhalation test showed that rabbits and white mice exposed to the biopreparation in an atmospheric concentration of 0.1 mg/m$^3$ exhibited transient physiological responses. In rabbits, as illustrated in Table 7, body temperature, pulse rate, and respiratory rate increased following exposure but began to normalize over time. Similarly, in white mice, as is illustrated in Table 8, significant increases in temperature, pulse rate, and respiratory rate were observed within the first 10 minutes of exposure, followed by a gradual return to baseline values.

The most pronounced changes in the dynamics of clinical parameters in animals were observed during the inhalation test. Prior to the test, reflex sensitivity in animals from both experimental groups was within normal limits: the corneal reflex was present, and the animals exhibited a sharp response to painful stimuli. Pupillary size was normal, and respiration and pulse rate were within physiological norms.

Following inhalation of the biopreparation, a decrease in reflex response to painful stimuli was noted, the corneal reflex became weak, and the pupils were dilated. Respiration became rapid and shallow, while pulse rate increased sharply. Specifically, the pulse rate in rabbits increased by 9.5% after 10 minutes of exposure and by 11.6% after 20 minutes. In white mice, a sharp increase in pulse rate of 27.7% was observed after 10 minutes; however, after 20 minutes, a decline in pulse rate was noted. The dynamics of respiratory function changes were identical in laboratory animals of both species.

During inhalation of the biopreparation containing essential oils of *Nepeta cataria*, a neuroendocrine response occurred in the animals, inducing a transient state of excitation.

Thus, after the administration of the biopreparation containing essential oils of *Nepeta cataria*, the mean values of temperature, pulse, and respiration in laboratory animals remained stable, with minor deviations returning to normal within a short period. No severe adverse cutaneous or conjunctival reactions to the biopreparation were detected.

Optimal dosages, concentrations, and rational application regimens were developed to ensure the effective and safe use of the biopreparation for treating cattle against ectoparasites using an automated dispensing device.

To determine the median lethal dose, the biopreparation was tested on flies and horseflies at dilution ranges from 0.02 to 0.4 per 100 mL, and on mites using an immersion method, where they were submerged in aqueous solutions of the test biopreparation for 1 minute. Each dilution was tested on 50 insects and mites. The experiments were conducted in triplicate, and the average results are presented in Table 5.

TABLE 5

Results of the Evaluation of the Efficacy of the Obtained
Biopreparation under Laboratory Conditions

| # | Concentration (dilution), g/mL | Mortality of insects and ticks within 24 hours (%) |
|---|---|---|
| 1 | 0.02:100 | 80 ± 4 |
| 2 | 0.05:100 | 80 ± 2 |
| 3 | 0.1:100 | 95 ± 3 |
| 4 | 0.2:100 | 100 ± 2 |
| 5 | 0.4:100 | 100 ± 2 |
| Cyfluthrin-based synthetic pyrethroid (0.2 mg cyfluthrin/mL) | 95 ± 5 | 98.5 ± 4 |

The study results demonstrated that, against ectoparasites and dipteran insects, the tested biopreparation at dilutions 4 and 5 exhibited higher efficacy than cyfluthrin-based synthetic pyrethroid. The efficacy exceeded that of cyfluthrin-based synthetic pyrethroid, which was used at the recommended concentration according to its application instructions, by 1.5-15%. In the first case, the total spray volume per animal over three treatments was 500±100 mL Considering the obtained data and the fact that the biopreparation is of organic origin, it was used in field conditions at a dilution of 0.2:100 mL for treating cattle against the most common ectoparasites in Kazakhstan, including flies, horseflies, and ticks.

The optimal dosage of the biopreparation for controlling ectoparasites in cattle was determined through spraying using an automated device. The application was performed in doses of 150-200 mL per animal and 250-300 mL per animal per single approach to the watering area, with a 3-hour interval, applied three times within 24 hours. In the first case, the total spray volume per animal over three treatments was 500±100 mL. In the second case, it was 800±100 mL.

Upon evaluating the results, it was found that the ectoparasite occurrence index on the animals' skin did not differ and was independent of the sprayed volume of the biopreparation. This allowed for the selection of the 150-200 mL per animal dose and a total volume of 500±100 mL per animal over three approaches to the watering area.

The interval between treatments was established according to the Smart automated spraying system program.

To assess the efficacy of the biopreparation applied through an automated device and to determine the level of ectoparasite infestation in animals, classical parasitological methods were employed, including the Abundance Index (AI), which is the average number of a specific parasite species per unit of observation (per examined animal), and the Occurrence Index (OI), which is the percentage of observed subjects on which a specific parasite species or group of species was detected.

Field trials were conducted using a spray method on cattle skin, applying a solution with an active ingredient concentration of 0.2%.

The insecticidal-acaricidal biopreparation was diluted with water to the required working concentration before use. The working solution was prepared by mixing a pre-measured volume of concentrated solution with water in a reservoir immediately before application, at a ratio of 500 mL of 5% solution per 10 L of water.

Pasture flies (*Musca* spp.) were observed throughout the daylight hours on the head, neck, back, sides, abdomen, and limbs. The Abundance Index ranged from 0 to 0.7 specimens per animal, and the Occurrence Index varied from 0 to 20%.

Blood-sucking mosquitoes (Culicidae), blackflies (Simuliidae), and horseflies (Tabanidae) were observed across the entire body throughout the daylight period. The Abundance Index for the blood-sucking mosquitoes and the blackflies ranged from 0 to 4.3 specimens per animal. The Occurrence Index was 100% in the summer for the blood-sucking mosquitoes. The Occurrence Index was 100% for the blackflies. The Abundance Index for the horseflies. The Abundance Index for the horseflies ranged from 0 to 3.5 specimens per animal. The Occurrence Index varied from 0 to 33%.

Biting Lice (*Bovicola bovis*) were detected throughout the study period, causing itching, restlessness, hair loss, and reduced body weight in animals. They were observed on the head, neck, back, flanks, and abdomen. The Abundance Index ranged from 8 to 11.6 specimens per animal. The Occurrence Index was 100% in the summer period.

Ixodid Ticks (*Dermacentor* spp.), which transmit blood-parasitic diseases and feed on animal blood, were found in the neck and lower body regions. The Abundance Index ranged from 1.2 to 3.2 specimens per animal. The Occurrence Index varied from 25 to 35%.

TABLE 6

Species Composition and Infestation Levels of Cattle Ectoparasites in Spring-Summer

| Parasite species | Localization on the animal's body | Abundance Index (AI), specimens | Occurrence Index (OI), % |
|---|---|---|---|
| *Musca* spp. (pasture flies) | Head, neck, back, flanks, abdomen, limbs | 10-7 | 0-20 |
| Culicidae (mosquitoes) | Entire body surface | 0-4.3 | 100 |
| Simuliidae (blackflies) | Entire body surface | 0-4.3 | 100 |
| Tabanidae (horseflies) | Entire body surface | 0-3.5 | 0-33 |
| *Bovicola bovis* (biting lice) | Head, neck, back, flanks, abdomen | 8.6-11 | 100 |
| *Dermacentor* spp. (ixodid ticks) | Neck, ventral part of the body | 1.2-3.2 | 25-35 |

The biopreparation was used as a 5% aqueous solution. To prepare the working solution, 0.5 L of the biopreparation was diluted in 10 L of water. The consumption per animal amounted to 500±100 mL.

Each animal's approach to the watering platform lasted an average of 60±10 seconds, during which time 150-200 mL of the working solution was dispensed through a spraying system consisting of three nozzles.

The system was configured such that with three approaches to the watering platform per day, the total volume of working solution applied to the animal's hair coat ranged from 450 to 600 mL.

TABLE 7

Results of Animal Treatment during a First Period from August 12 to August 20 Using the Automated Smart Spraying System

| Parameter | Value |
|---|---|
| Total volume of biopreparation used per session | 500 mL |
| Volume per individual spraying | up to 500 mL |
| Interval between treatments | not less than 300 seconds |
| Total number of animals treated | 84 |
| Total volume of biopreparation used | 37.8 L |
| Average daily amount of biopreparation used per animal | 165 ± 146 mL |
| Average number of sprayings per animal | 5.19 ± 2.93 |

Figure 2:
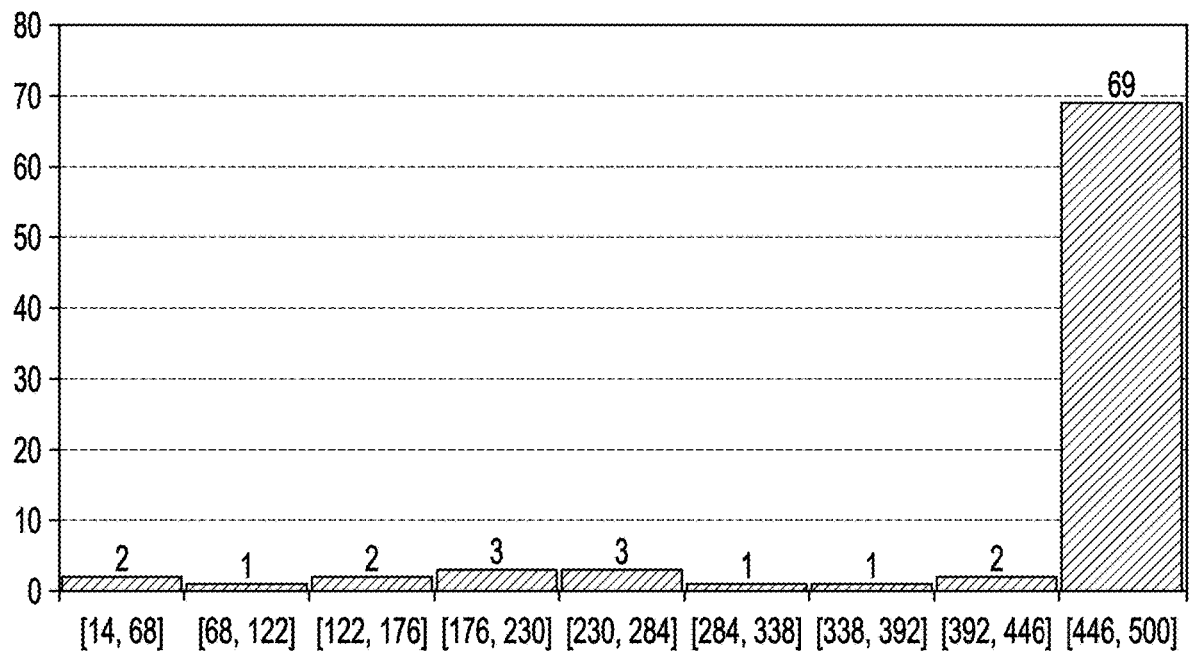
FIG. 2 is a graphical view illustrating an example of a number of animals that were treated according to the present invention during the first period.

From FIG. 1, it follows that the primary volume of treatment occurred on the first day of the August 12 to August 20 first period and the subsequent three days of observation. The final five days of the observation period are characterized by a decreasing volume of treatment. As seen from FIG. 2, the majority of animals during this first period were fully treated in accordance with the established protocol.

TABLE 8

Results of Animal Treatment during a Second Period from August 26 to August 31 Using the Automated Smart Spraying System

| Parameter | Value |
|---|---|
| Total volume of biopreparation used per session | 500 mL |
| Volume per individual spraying | up to 150 mL |
| Interval between treatments | not less than 300 seconds |
| Total number of animals treated | 82 |
| Total volume of biopreparation used | 33.1 L |
| Average daily amount of biopreparation used per animal | 208.17 ± 161.07 mL |
| Average number of sprayings per animal | 5.11 ± 2.26 |

Figure 3:
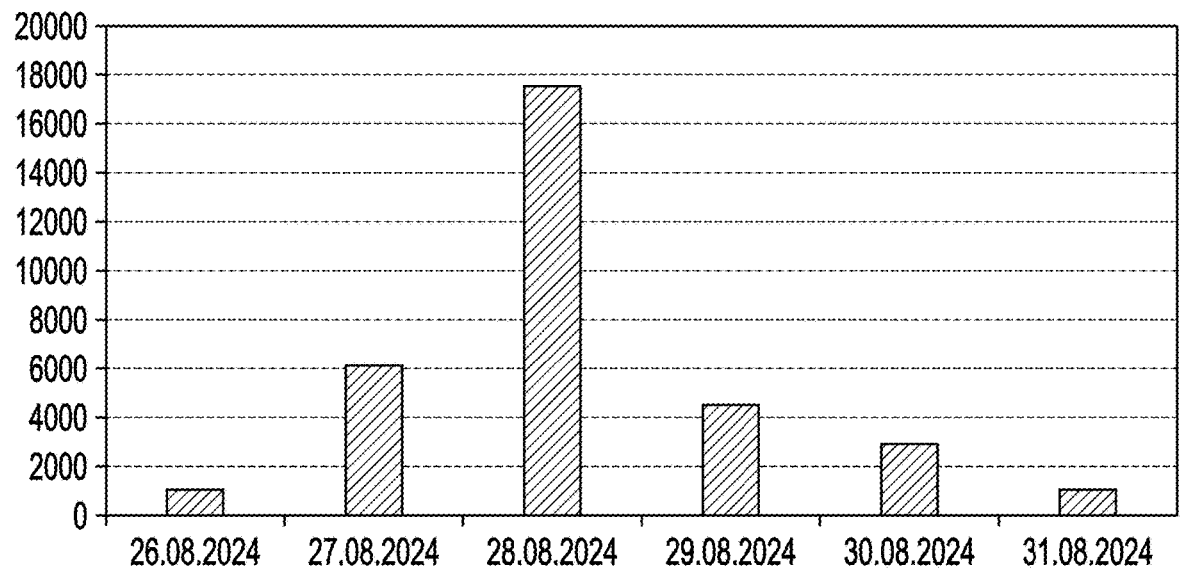
FIG. 3 is a graphical view illustrating an example of a volume of the biopreparation applied by treatment days according to the present invention during a second period.
Figure 4:
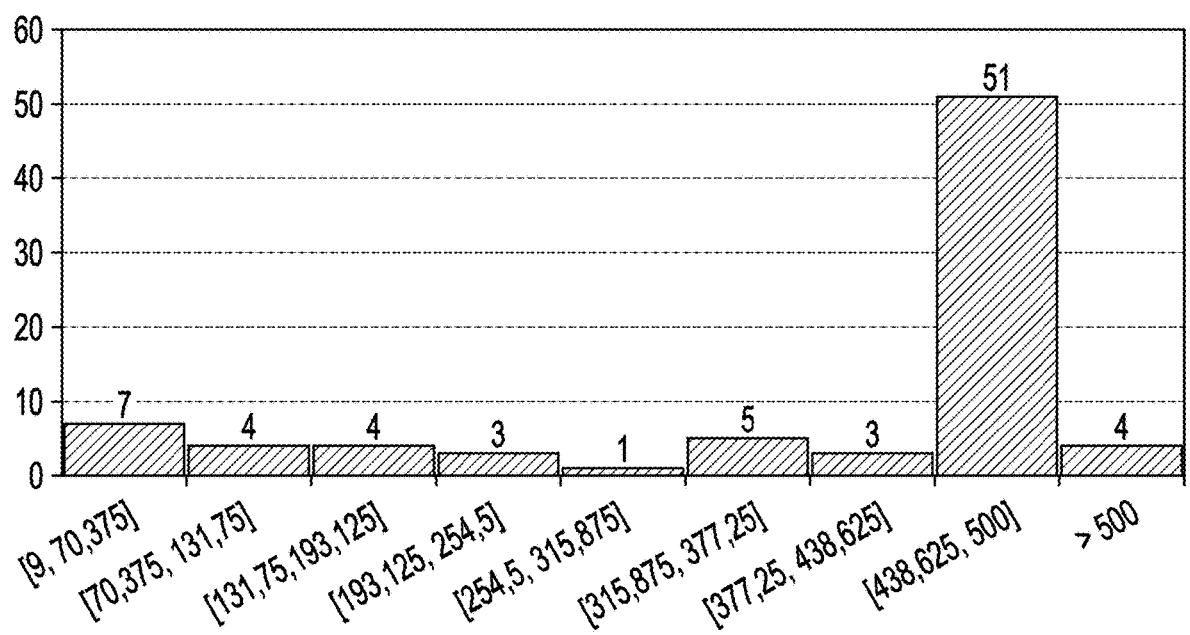
FIG. 4 is a graphical view illustrating an example of a number of animals that were treated according to the present invention during the second period.

As seen from FIG. 3, the main volume of treatment was applied on the third day of the August 26 to August 31 second period. This is explained by the influence of natural factors (e.g., rainy weather). From FIG. 4, it is evident that the majority of animals were fully treated in accordance with the established protocol during that the second period. At the same time, for a few animals (n=4), the treatment volume slightly exceeded the required amount.

The duration of action of the tested insectoacaricidal phytopreparation, applied via an automated device for livestock treatment, was assessed at 7-day intervals after application, as is document in Table 9.

TABLE 9

Effectiveness of Treatment with the Insecticidal Phytopreparation Containing Essential Oils of *Nepeta cataria*

| Type of ectoparasite | 7 Days After Infestation index ($I_и$), ex. | 14 Days After | 21 Days After | 7 Days After Incidence rate ($I_B$), % | 14 Days After | 21 Days After |
|---|---|---|---|---|---|---|
| Pasture flies (*Musca* spp., incl. face fly) | 0 | 0 | 0.1 | 0 | 0 | 5.1 |
| Bloodsucking mosquitoes: *Culex* spp. | 0 | 0 | 0.4 | 0 | 0 | 11.6 |
| Biting midges: *Simulium* spp. | 0 | 0 | 0 | 0 | 0 | 0 |
| Horseflies: *Tabanus* spp. | 0 | 0 | 0.5 | 0 | 0 | 12 |
| Biting lice: *Bovicola bovis* | 0 | 0 | 0 | 0 | 0 | 0 |
| Ixodid ticks: *Dermacentor reticulatus* | 0 | 0 | 0.1 | 0 | 0 | 2.5 |

As shown in Table 9, the effectiveness of treating cattle with the phytopreparation containing essential oils of *Nepeta cataria*, using an automated device, was 100% during the first 14 days after spraying and remained at this level for at least 15-20 days.

On day 21 after treatment, only isolated ectoparasite specimens were detected on the animals.

As seen in Table 10, the physiological parameters in cows were within normal limits both before treatment and seven days after application of the biopreparation.

TABLE 10

Physiological Health Indicators of Cattle Before and After Spraying with Insectoacaricidal Biopreparation

| Indicator | Temperature (° C.) | Pulse (beats/min) | Respiration Rate (breaths/min) |
|---|---|---|---|
| Before Treatment | 37.92 ± 0.16 | 66 ± 0.63 | 18 ± 0.15 |
| 7 Days After Treatment | 38.05 ± 0.06 | 60 ± 0.28 | 19 ± 0.05 |
| Normal Reference Values | 37.5-39.0 | 50-80 | 15-30 |

The obtained hematological blood test results show that all parameters remained within physiological norms after treatment with the insectoacaricidal preparation, with slight multidirectional trends of increase or decrease. For example, hemoglobin concentration increased by 3.24%, red blood cell count rose by 10.75%, while white blood cell count showed a slight decrease of 0.92%. Among the leukocyte differential counts, a slight increase in lymphocytes (by 9.1%) and platelets (by 3.99%) was noted, against a small decrease in granulocyte content (by 1.3%). All observed dynamics remained within physiological limits.

The results of biochemical blood analysis indicated increases in total protein by 2.79% ($P \leq 0.01$), calcium by 5.4% ($P \leq 0.001$), and creatinine by 9.73% ($P \leq 0.05$), all within physiological norms. No significant changes were observed in other biochemical blood parameters.

The findings indicate that the biopreparation does not exert persistent toxic effects on the physiological parameters of laboratory animals and does not cause adverse reactions, allowing the substance to be classified as low-toxicity.

The biopreparation enables the complete elimination of ectoparasites in a single treatment and maintains its efficacy for 14 days. It is non-toxic, non-irritating to the animal's skin, harmless to animals and the environment, and has no restrictions for use in lactating animals, young stock, or in the consumption of milk and meat obtained following treatment.

The biopreparation can be used by veterinary professionals in agricultural enterprises to ensure veterinary welfare by protecting animals from ectoparasites. It may also be employed in educational settings for students specializing in veterinary medicine The invention relates to the field of veterinary science, specifically to parasitology and invasive animal diseases, as well as veterinary pharmacology. It may be used for the prevention and control of diseases in animals caused by ectoparasites.

The technical result is the development of an effective and harmless biopreparation for the prevention and treatment of ectoparasitoses in cattle. This is achieved by including, as active ingredients, products of plant fiber pyrolysis and essential oil of *Nepeta cataria*, obtained via hydrodistillation. These components ensure a high insectoacaricidal and repellent effect.

The active substances include rice husk tar, phenol, cresol, phenolic acids, essential oil of *Nepeta cataria*, and water. The liquid-phase biosubstance, which forms the basis of the obtained biopreparation, is produced by dry distillation (pyrolysis) of rice husks with high resin content. Based on chemical parameters, the rice husk biosubstance contains phenol, phenolic acids, and cresol within acceptable normative values, which determine its insectoacaricidal properties.

The essential oil raw material from *Nepeta cataria* is processed via steam distillation. *Nepeta cataria* contains nepetalactone, a compound with repellent activity.

The proposed method involves the application of the insectoacaricidal biopreparation for the treatment of cattle against ectoparasites using an automated Smart spraying system developed by radio electronics specialists from Saken Seifullin Kazakh Agrotechnical University.

The automated Smart spraying system is designed to ensure stress-free treatment of animals and improve the application of liquid ectoparasiticides. To guarantee full coverage of the animal's coat, the system accounts for the spray nozzle angles and the animal's positioning relative to the unit, thereby creating an effective spraying mechanism that ensures even distribution of the liquid over the animal's skin surface.

The proposed biopreparation eliminates ectoparasites in a single treatment and maintains its efficacy for 14 days. It is non-toxic, does not irritate the skin or mucous membranes, is safe for animals and the environment, and has no usage restrictions.

To apply the biopreparation, the animal's skin is sprayed with a working solution of the biopreparation using an automated Smart system. The working solution of the biopreparation is prepared by diluting 0.5 L of a 5% solution of the preparation in 10 liters of water. The application rate per animal is 500±100 mL. A single visit of an animal to the watering platform lasts approximately 60±10 seconds, during which 150-200 mL of the working solution is sprayed through three nozzles. The automated system is calibrated so that, with three visits per day, each animal receives 450-600 mL of the working solution evenly distributed on its coat.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A biopreparation against ectoparasites of cattle, comprising:

pyrolysis products of plant fiber;

*Nepeta cataria* essential oil; and water, wherein the plant fiber is rice husk cellulose, and wherein the pyrolysis products comprise rice husk tar, phenol, cresol, and phenolic acids.

2. The biopreparation according to claim 1, wherein the pyrolysis products constitute 21.3% by mass of the biopreparation, and wherein the essential oil constitutes 0.2% by mass of the biopreparation.

* * * * *

UNITED STATES PATENT AND TRADEMARK OFFICE
CERTIFICATE OF CORRECTION

| | | |
|---|---|---|
| PATENT NO. | : 12,484,586 B1 | Page 1 of 1 |
| APPLICATION NO. | : 19/217261 | |
| DATED | : December 2, 2025 | |
| INVENTOR(S) | : Gulzhan Yeszhanova Tursunovna et al. | |

It is certified that error appears in the above-identified patent and that said Letters Patent is hereby corrected as shown below:

On the Title Page

The Foreign Application Priority Data (Item (30)) should be added to read as follows:
December 6, 2024 (KZ) ......................2024/1050.1

Signed and Sealed this
Third Day of February, 2026

John A. Squires
*Director of the United States Patent and Trademark Office*